Aug. 14, 1923.

R. HUMPHRIES 1,464,848

TRACTOR

Filed Aug. 25, 1921

INVENTOR.
Ralph Humphries
BY
ATTORNEY.

Patented Aug. 14, 1923.

1,464,848

UNITED STATES PATENT OFFICE.

RALPH HUMPHRIES, OF DETROIT, MICHIGAN.

TRACTOR.

Application filed August 25, 1921. Serial No. 495,376.

*To all whom it may concern:*

Be it known that I, RALPH HUMPHRIES, a citizen of the Dominion of Canada, residing at Detroit, county of Wayne, and State of Michigan, have invented a new and useful Improvement in Tractors, of which the following is a specification, reference being had therein to the accompanying drawings.

My invention relates to tractors, and more particularly to the method of housing the power plant and power transmissions thereof, and to the method of supporting the same from the front and rear axles.

One of the objects of my invention is to provide a power plant and power transmission housings and support of as nearly integral construction as is possible, while at the same time retaining the important features of strength and easy access to the working parts.

Another object of my invention is to provide a novel radiator support and front axle attachment integral with the crank case and to connect said crank case with other housing members to form a support for an engine.

Another object of my invention is to do away with the ordinary frame for supporting the various housings and mechanisms from the axles.

Another object of my invention is to so construct the housings and supporting members that the above result may be obtained and at the same time simplify the casting thereof and eliminate, as nearly as is possible, the operations of machining the same.

These and other objects and advantages are shown in the arrangement, combination and construction of the various parts of my improved device as described in the specification, claimed in my claim and shown in the accompanying drawings, in which:

Fig. 1 is an elevation showing a tractor embodying my invention.

Fig. 2 is a top or plan view of the crank case used therein, showing the lower half of the fly wheel housing and a radiator support integral therewith.

Fig. 3 is an end view showing the radiator support and axle connection.

I have used the reference numeral 10 to indicate generally a crank case, with flanges 11 projecting from either side thereof, to which the flange 12 of the engine casing 13 is bolted through the bolt holes 14.

The crank case proper is closed in front at 15 so as to prevent the escape of the oil therein. A nose 16, however, is formed integral therewith and extends forwardly over the axle 17. The customary front wheels 18 are journaled on the ends of the axle 17.

Extending downwardly from the nose 16 are lugs 19 and 20, between which the axle 17 is positioned. The lugs 19 and 20 have alined openings 21 therein and the axle 17 has a corresponding opening therein at substantially the center thereof. A bolt 22, having a head 27 on one end thereof and a nut 23 on the other end thereof is adapted to be inserted through the said openings in the lugs and the axle, so that the front end of the tractor is pivoted and supported thereon.

Extending forwardly from the top of the nose 16 are plates or brackets 24, having holes 25 therein so that the bottom of the radiator tank 26 may be bolted thereon. These plates or brackets 24 are formed integral with the nose or extension 16.

The crank case 10 has an opening in the bottom thereof over which the plate 38 is held by bolts 39 so that repairs can be made therein without removing the engine casing 13.

The crank case 10 and engine casing 13 have housing sections 28 and 29, respectively, formed integrally therewith at the rear thereof for housing the flywheel. The housing section 28 has a flange 30 on its rear face and the housing 29 has a flange 31 on its rear face, which flanges abut a flange 32 on the front flared end 33 of the transmission housing proper 34. Bolts 35 pass through the flanges 30 and 31 and the flange 32, fastening and holding the same together.

The transmission housing proper 34 has a rear flared end 36 integral therewith. A reinforcing web 37 extends from the front flared end 33 to the rear flared end 36 of the transmission housing proper 34, in order to prevent breakage thereof under strains. The flared end 36 has a flange 40 thereon which abuts the flange 41 of the rear axle and differential housing 42. The two flanges are bolted together with bolts 43. Supporting and extending through the housing 42 is the rear axle 44, which has at either side thereof the usual wheels 45.

It will thus be seen that I have provided a tractor housing mechanism mounted in a novel manner on the wheels of the tractor, which housing mechanism not only supports itself independent of a frame, but the entire tractor with the exception of the axles and wheels. It will also be seen that I have provided a strong and compact structure, easy of manufacture and assembly, as well as one whereby the working parts of the tractor may be easily and quickly reached for repair.

It is obvious that some changes may be made in the arrangement and combination of the various parts of my improved device without departing from the spirit of the invention therein, and I do not wish to limit myself to the exact structure shown, it being my intention to cover by my claim such changes as may be reasonably included within the scope thereof.

What I claim is:

In combination, an engine, a casing disposed thereunder adapted to support said engine and having an integral hollowed out portion at one end thereof adapted to partially house an engine fly wheel and for attachment to another housing member and an integral hollow nose at the other end thereof beyond the forward end of said engine adapted to partially shield certain operating parts and having integral downwardly extending lugs adapted to be pivoted to an axle and a pair of upwardly extending brackets thereon, provided with flattened plates at their upper ends and holes in said plates through which a radiator may be secured and supported upon said plates.

RALPH HUMPHRIES.